Figure 1:
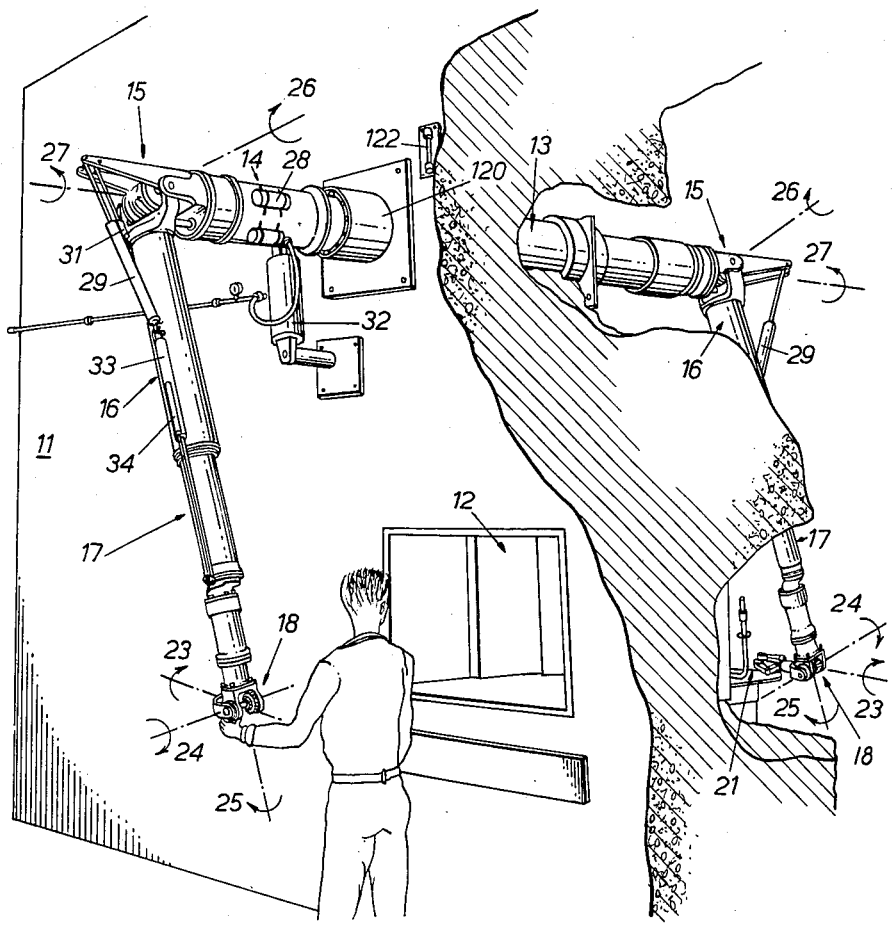

Nov. 23, 1965    A. AINSWORTH    3,219,200
REMOTE-CONTROL MANIPULATOR
Filed May 1, 1963    11 Sheets-Sheet 1

-FIG. 1.-

-FIG. 3.-

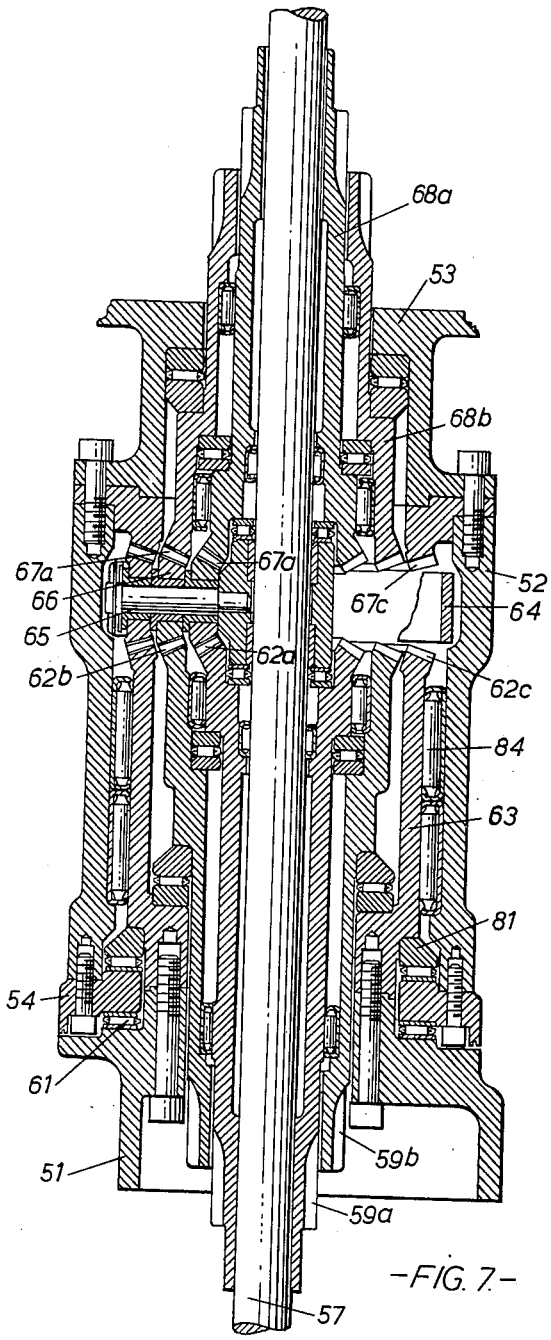
-FIG. 7.-

Nov. 23, 1965 A. AINSWORTH 3,219,200
REMOTE-CONTROL MANIPULATOR
Filed May 1, 1963 11 Sheets-Sheet 7
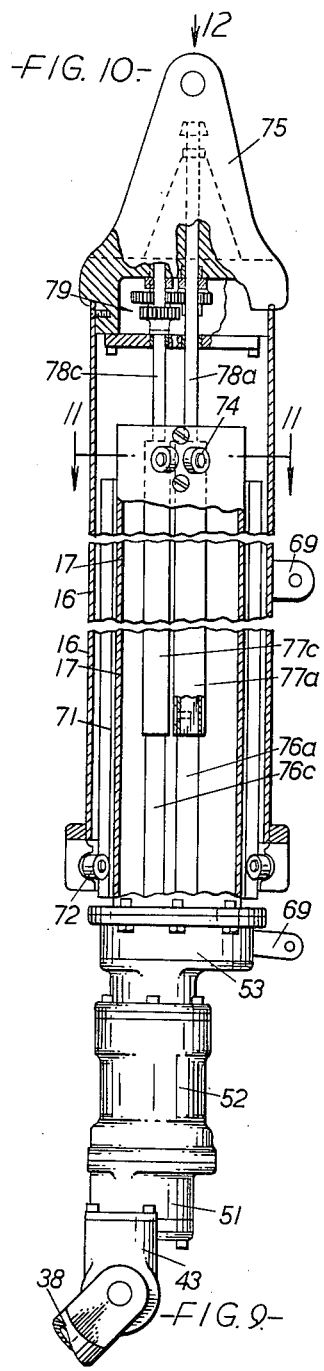
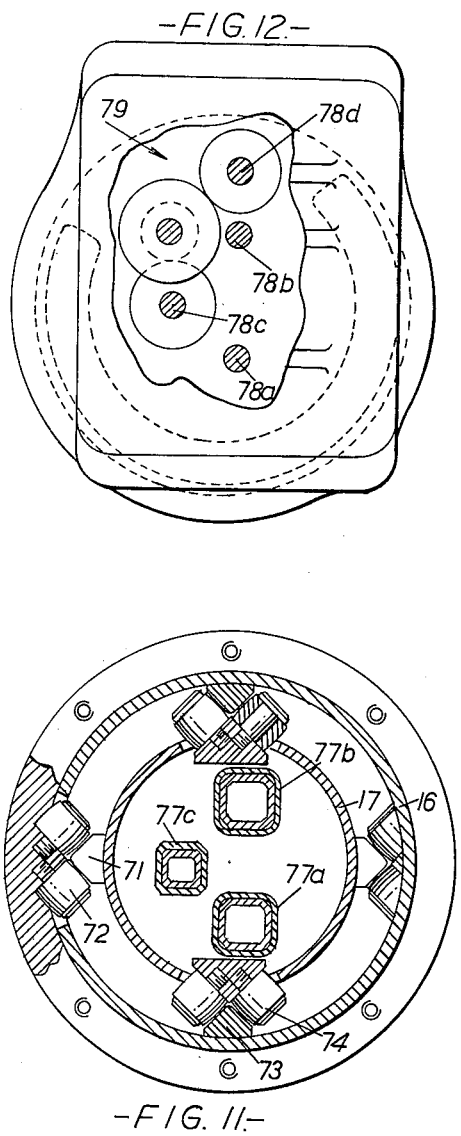

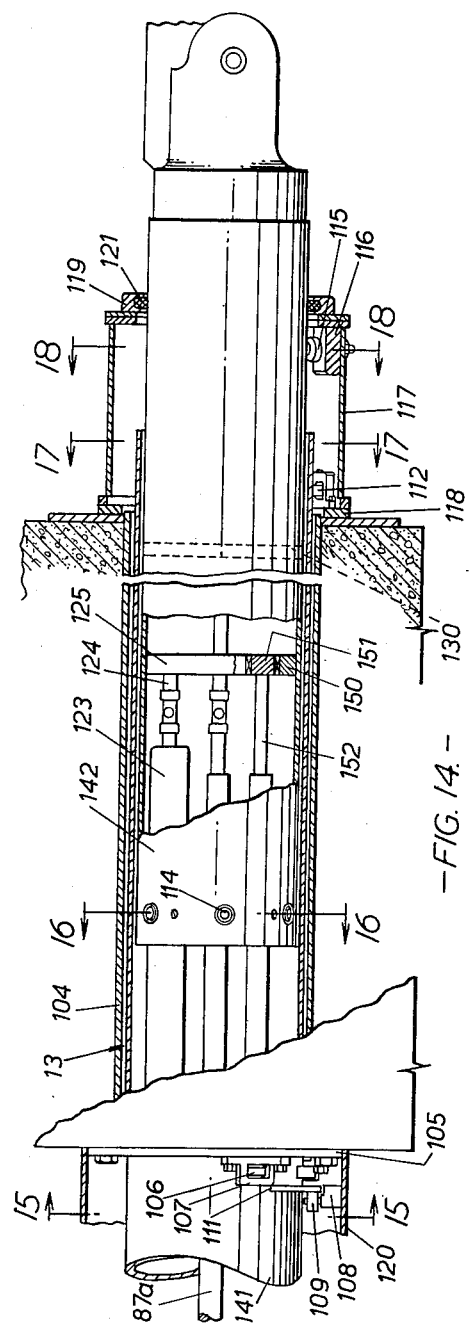

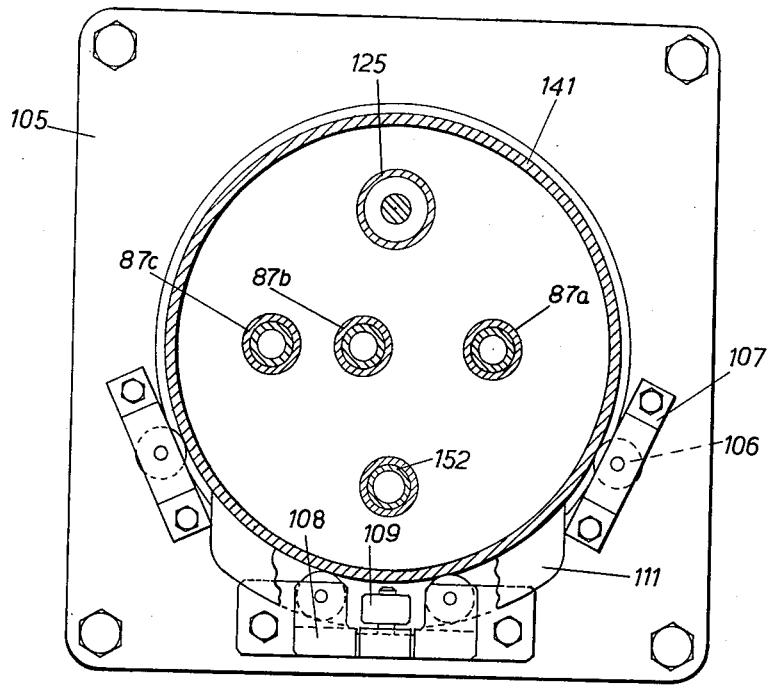
-FIG. 15.-
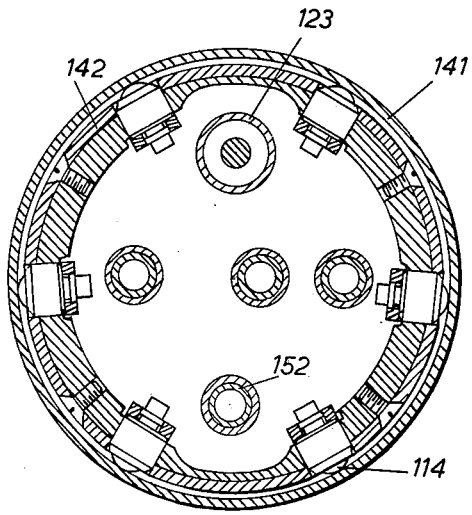
-FIG. 16.-

United States Patent Office 3,219,200
Patented Nov. 23, 1965

3,219,200
REMOTE-CONTROL MANIPULATOR
Alan Ainsworth, Thurso, Caithness, Scotland, assignor to United Kingdom Atomic Energy Authority, London, England
Filed May 1, 1963, Ser. No. 277,202
Claims priority, application Great Britain, May 7, 1962, 17,441, 17,442
2 Claims. (Cl. 214—1)

This invention relates to remote-control maniupulators whereby objects, such as radioactive materials, can be manipulated in a shielded cabinet by an operator standing outside the cabinet and viewing the object through a window in the cabinet shielding.

A remote-control manipulator has a master arm carrying a handgrip outside the shielded cabinet and a slave arm carrying a work handler within the cabinet. Since it is necessary for the operator to be able to watch the handler, the working area within the cabinet is limited by the width of the shielded window. Any increase in this area must be gained, therefore, by extending the reach of the manipulator in a plane normal to the shielded window. In known manipulators having master and slave arms linked to pivot with respect to a horizontal beam extending between them, the reach of the manipulator has been increased by making the master and slave arms extensible. In these manipulators the slave arm can be caused to pivot away from the window with respect to the beam independently of the master arm. However, in order to bring the work handler down to its original height, the operator must cause extension of the slave arm by extending the master arm. It then becomes difficult for the operator to control the manipulator by means of the handgrip which is abnormally low while simultaneously viewing the handler through the window. Thus an increase in the reach of this manipulator is gained at the expense of the ease with which the operator can control the reactor.

Accordingly, the present invention provides a remote-control manipulator comprising a transverse extensible beam, master and slave arms pivotally connected to the beam at shoulder joints spaced axially of the beam, a handgrip carried by the master arm, a work handler carried by the slave arm, means interconnecting the handgrip and the handler to cause movements of the handgrip to be reproduced by the handler, and means for causing extension of the beam to vary the axial displacement between the shoulder joints and thus to cause transverse displacement of the handler relative to the handgrip.

In one embodiment of the invention the transverse beam comprises two tubular beam casings one of which is telescopically slidable within the other and a fluid pressure operated ram is connected between the two casings to cause relative axial displacement of the casings.

Figure 2:
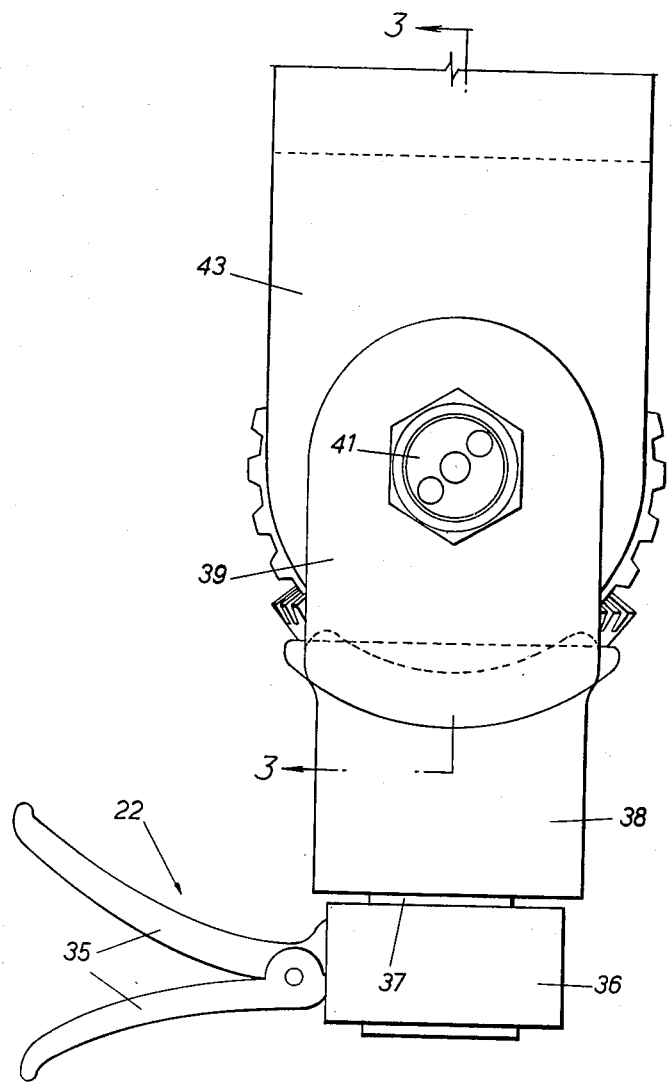
Figure 3:
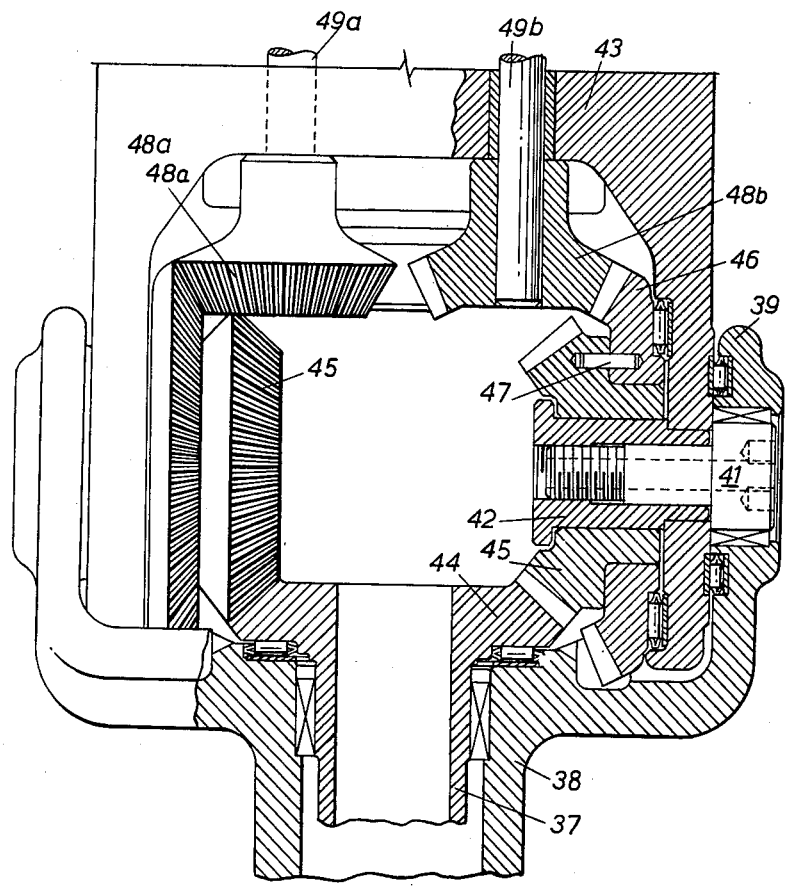
Figure 4:
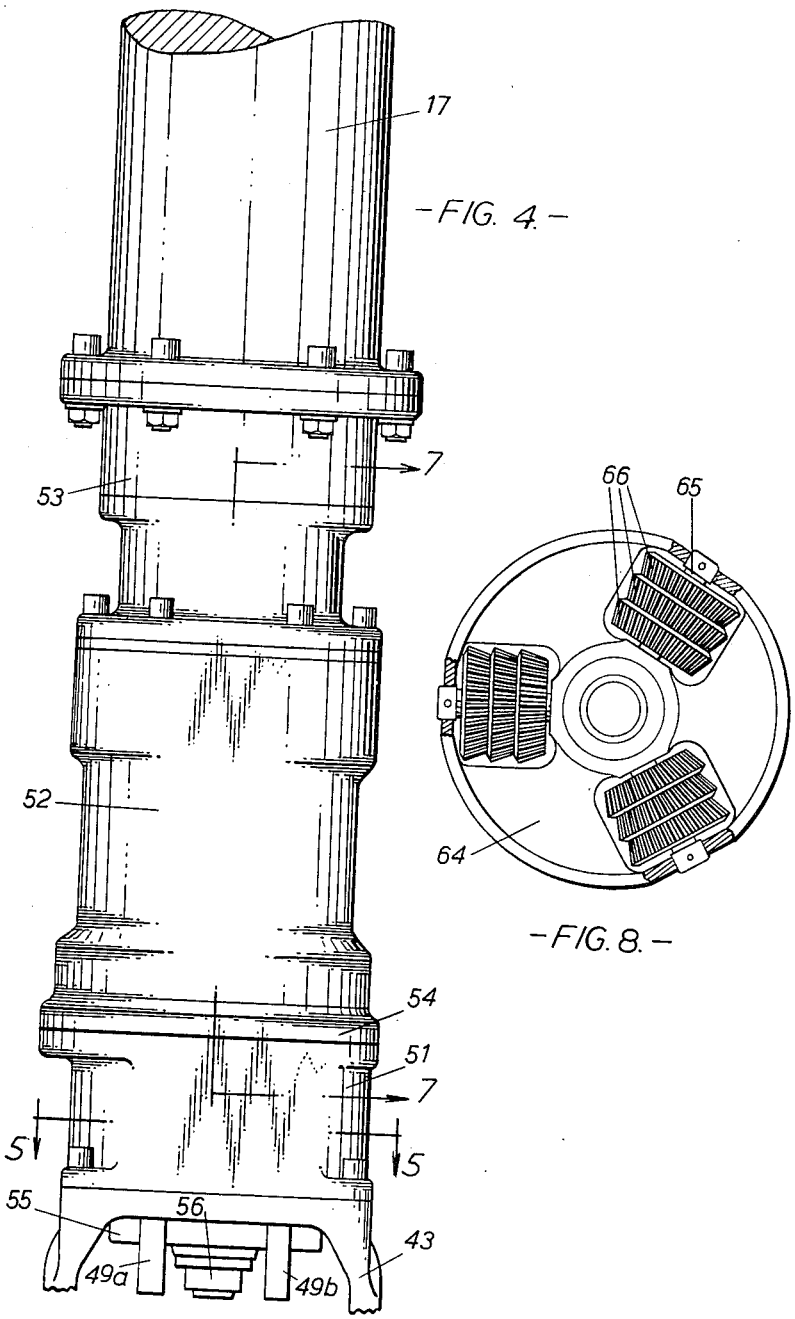
Figure 5:
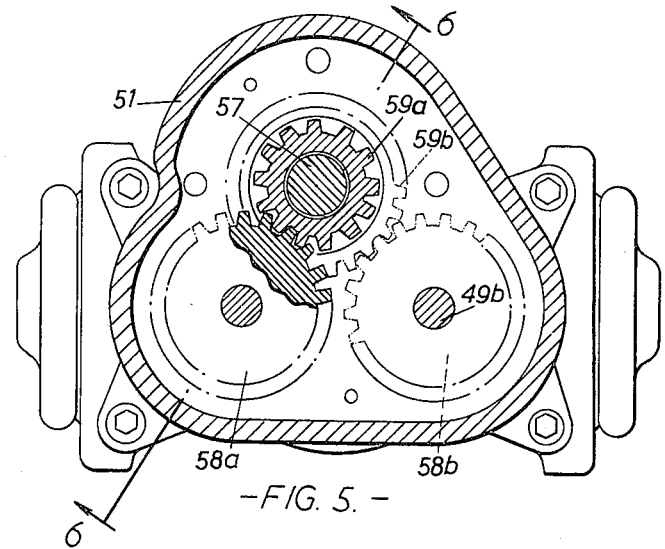
Figure 6:
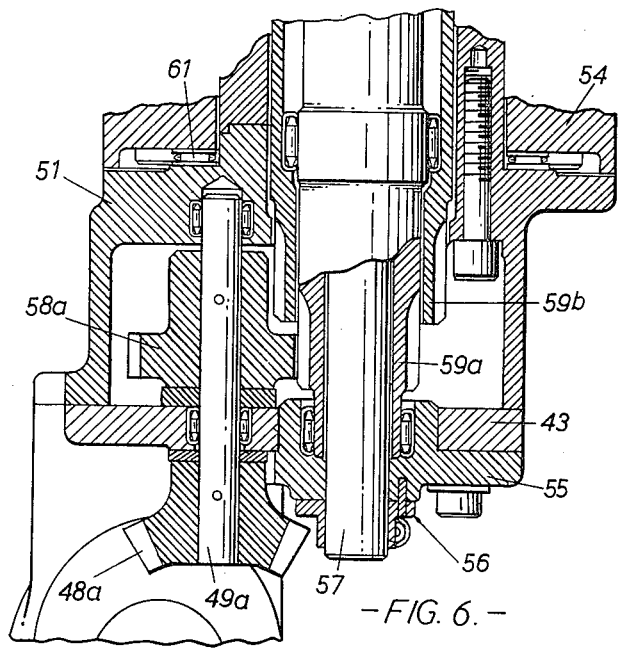
Figure 13:
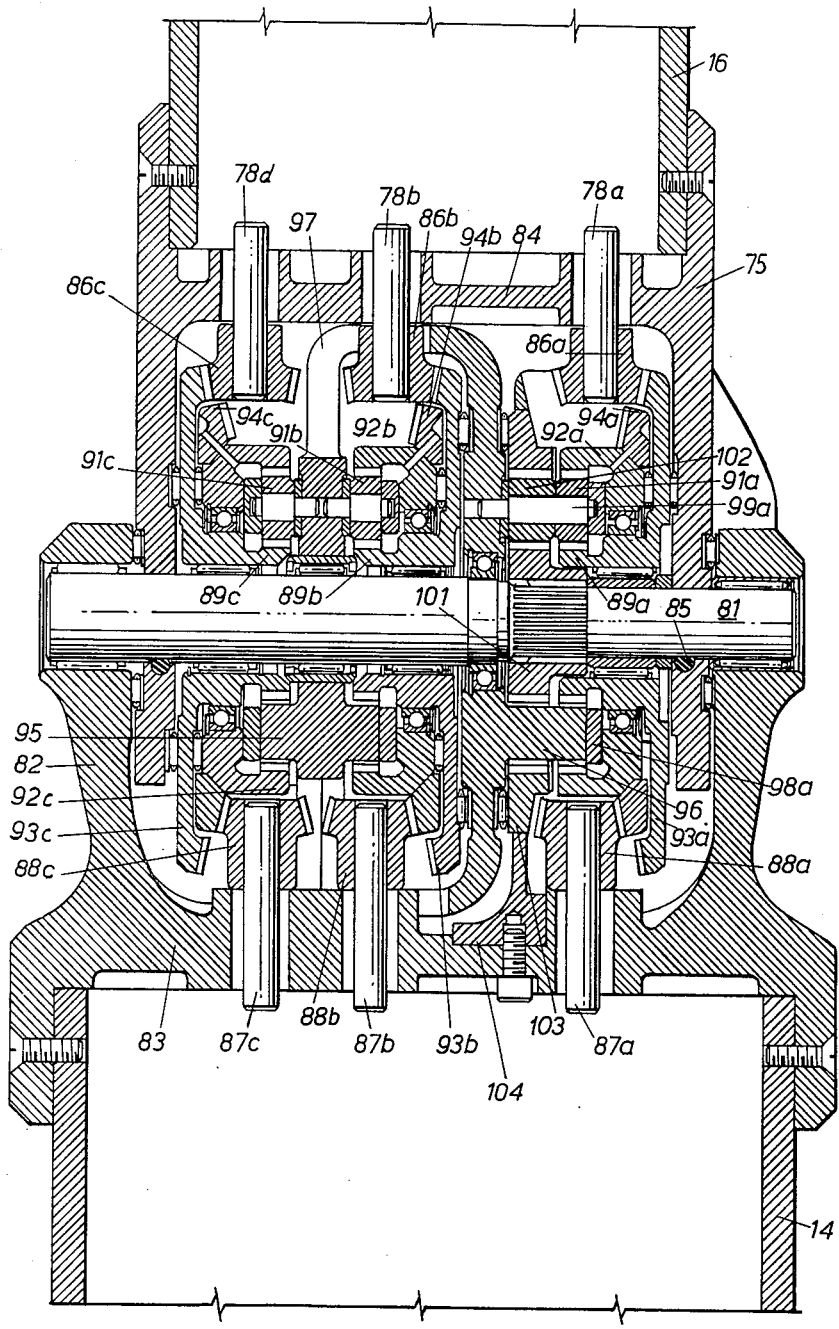
Figure 17:
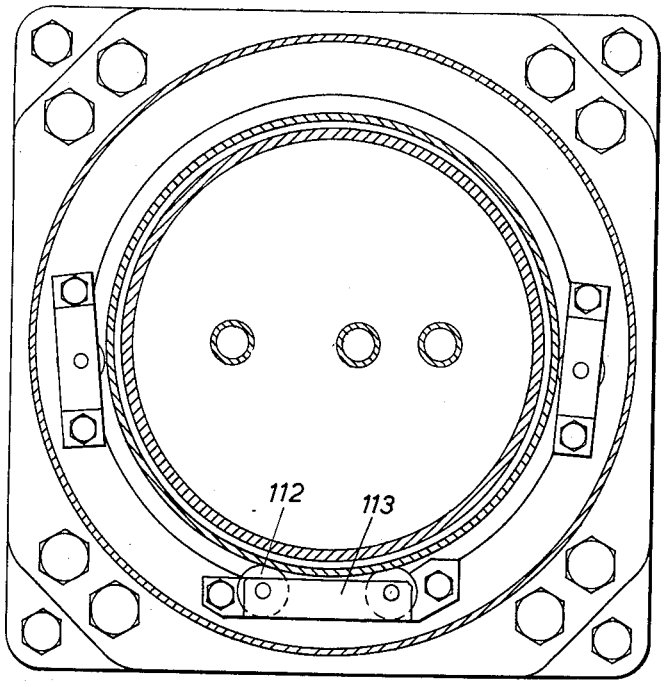
Figure 18:
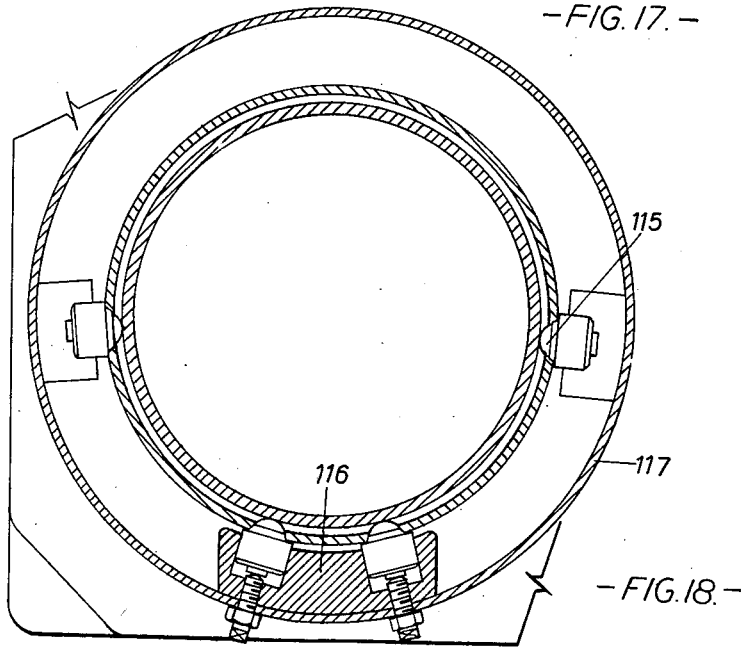

A manipulator embodying the invention will now be described by way of example with reference to the accompanying drawings in which:

FIGURE 1 is a perspective overall view of the manipulator,
FIGURE 2 is a side view of the manipulator master wrist unit,
FIGURE 3 is a section on line 3—3 of FIGURE 2,
FIGURE 4 is a front elevation of the lower part of the master arm,
FIGURE 5 is a section on line 5—5 of FIGURE 4,
FIGURE 6 is a section on line 6—6 of FIGURE 5,
FIGURE 7 is a section on line 7—7 of FIGURE 4 showing forearm compensating mechanism,
FIGURE 8 is a plan view of a detail of FIGURE 7,
FIGURES 9 and 10 are part section views of the lower and upper parts of the master arm,
FIGURE 11 is a section on line 11—11 of FIGURE 10,
FIGURE 12 is a view along arrow 12 with part of the master arm casing broken away,
FIGURE 13 is a sectional view of the master shoulder joint viewed from underneath,
FIGURE 14 is a part sectional view of the manipulator beam,
FIGURE 15 is a section on line 15—15 of FIGURE 14,
FIGURE 16 is a section on line 16—16 of FIGURE 14,
FIGURE 17 is a section on line 17—17 of FIGURE 14, and FIGURE 18 is a section on line 18—18 of FIGURE 14.

*General assembly*

In FIGURE 1 there is shown a perspective view of a manipulator embodying the invention. The manipulator is shown mounted in the wall 11 of a cabinet which is shielded so that radioactive materials can be handled by means of the manipulator by an operator outside the cabinet who views the materials through a shielded window 12. In FIGURE 1 the wall is shown broken away so that the master arm of the manipulator outside the cabinet and the slave arm within the cabinet can be seen.

The manipulator comprises a socket 13 in the wall through which is passed a beam 14 connected at each end by shoulder joints 15 to upper arms 16 of the master and slave arms. A forearm 17 telescopically mounted within each upper arm terminates at a wrist unit 18. Within the shielded cabinet the slave wrist unit supports a pair of jaws 21; outside the shielded cabinet the master wrist unit supports a handgrip 22 which is squeezed to close the jaws. There are six basic degrees of movement in the manipulator which are controlled by movement of the handgrip and are reproduced as movements of the jaws within the cabinet. The six degrees of movement are:

Rotation of the jaws or handgrip about the wrist units (arrow 23)
Flexure at the wrist units (arrow 24)
Rotation of the wrist units about the forearms (arrow 25)
Swing of the arms about the shoulder joints (arrow 26)
Rotation of the beam in its socket (arrow 27)
Telescopic movement of the forearms in the upper arms.

These six movements are transmitted from the master arm to the slave arm in the following manner. Rotation of the beam in its socket is transmitted directly from the master shoulder joint to the slave shoulder joint. Swing of the master arm about the master shoulder joint actuates a servo-valve 31 which initiates servo-assistance of the master arm movement and causes movement of the slave arm by movement of the rams 29. Similarly telescopic movement of the master forearm into the master upper arm actuates a servo-valve 34 which initiates servo-assistance of the master forearm movement and causes telescopic movement of the slave forearm by means of rams 33. Finally the three remaining movements at the master wrist unit are converted by gearing into relative movement of three rods (to be described hereinafter) which extend along the arms and the beam to similar gearing at the slave wrist unit; thus these three movements are transmitted by direct mechanical linkages. Compensating mechanisms (to be described hereinafter) are provided within the forearms and at the shoulder joints to counteract interference between the relative movements of the three rods.

The six movements are preferably all servo-assisted. As described above, hydraulic rams 29 and 33, with associated servo-valves 31 and 34, assist swing and telescopic movement of the master arm. Similarly a hydraulic ram 32, with a servo-valve (not shown in FIGURE 1), assists rotation of the beam in its socket. If desired, a set of hydraulic motors 24 clustered around the beam 14 may be linked to the three connecting rods to assist rotation of the jaws or handgrip about the wrist units, flexure at the wrist units and rotation of the wrist units about the forearms.

Wrist units, handgrip and jaw

As shown in FIGURE 2, which is an enlarged side view of the handgrip and part of the wrist unit, the handgrip 22 is constituted by two pivoted handles 35 carried by a bush 36 on a shaft 37 which is pivotally mounted in a bracket 38 forming part of the master wrist unit. Within the shaft 37 there is a hydraulic ram (not shown) actuated by means of the handles. This forms part of a circuit by which hydraulic power is supplied to a similar ram in the slave wrist unit. At the slave wrist unit the handles are replaced by the jaws 21 which can be opened and closed by the ram in the wrist unit. Provision is made for limiting the maximum pressure applied by the jaws when maximum pressure is applied at the handgrip; three ranges of clamping pressure are provided, namely pressure appropriate to loads at the slave jaws of 0 to 10 lbs., 10 to 30 lbs., and 30 to 50 lbs.

The lower part of the master wrist unit is shown in detail in FIGURE 3, which is a sectional view through part of FIGURE 2. Two lugs 39 integral with the bracket 38 carry pivot pins 41 provided with bushes 42 journalled in trunnions 43. Races of radial needle bearings are interposed between the lugs and the trunnions and between the lugs and the pivot pins. The shaft 37 journalled in the bracket 38 carries at its head a bevel gear 44 meshing with two opposed bevel gears 45 mounted for rotation one on the bush of each pivot pin 41. A toothed wheel 46 is secured to each bevel gear 45 by a pin 47 and each wheel 46 meshes with one of two pinions, 48a, 48b mounted on spindles 49a, 49b, journalled in the cross-piece of the trunnions 43. Needle bearings are interposed between the bevel 44 and the bracket and between the toothed wheels 46 and the trunnions.

In operation, rotation of the handgrip about the wrist unit causes rotation of the bevel gear 44, opposed rotation of the bevel gears 45 and thus opposed rotation of the pinions 48a, 48b and the spindles 49a, 49b. Flexure at the wrist unit of the handgrip about the pivot pins on the other hand, causes similar rotation of the bevel gears 45, the pinions 48a, 48b and the spindles 49a, 49b. Any combination of these two movements is transmitted by appropriate rotation of the two spindles 49a, 49b. It will be appreciated that similar gearing in the slave wrist unit translates relative rotation of the two spindles into appropriate movements of the jaws.

The trunnions 43 are bolted to a wrist casing 51 (FIGURE 4) supported at the lower end of the forearm 17 by a differential casing 52 bolted to a forearm casing 53 which is bolted to the forearm itself. The wrist casing 51 is rotatable with respect to the differential casing, a bearing race ring 54 being interposed between the two casings.

A bearing plate 55 (FIGURES 4 and 5) bolted to the trunnions 43 carries a clamp 56 by which a spindle 57 is secured to the wrist casing 51. The wrist casing 51 houses centralising gears (FIGURES 5 and 6) comprising pinions 58a, 58b on the spindles 49a, 49b, engaging splines on wrist rods 59a, 59b mounted concentrically around the spindle 57 by means of needle bearings, the inner wrist rod 59a extending beyond outer wrist rod 59b for this purpose. In operation, the centralising gears convert rotary movements of the spindles 49a, 49b into rotary movements of the rods 59a, 59b. Bearings 61 (FIGURE 6) carried by the bearing race ring 54 ease rotation of the wrist casing 51 with respect to the forearm. Such rotation is indicated by rotation of the spindle 57 relative to the forearm. Thus the three angular wrist movements are transmitted by rotational movements of the spindle 57 and the concentric wrist rods 59a, 59b relative to each other and to the forearm 17. Within the shielded cabinet similar centralising gears perform the same function for the slave wrist unit.

Forearm compensating mechanism

Forearm compensating mechanism (FIGURES 7 and 8) is housed in the differential casing 52 to counteract interference between the relative rotations of the forearm, the wrist rods and the central spindle 57. Without such compensation a simple rotation of the wrist unit with respect to the forearm would result in relative movement between the wrist rods and the spindle 57. This relative movement would cause flexure of the wrist unit. Similar compensating mechanism is provided in the differential casing of the slave forearm.

The spindle 57 extends upwardly through the compensating mechanism and is unaffected by it. Surrounding the spindle the inner concentric wrist rod 59a, which is rotatable on needle bearings and supported by thrust bearings, is terminated by an inner ring bevel 62a. Similarly, the outer concentric wrist rod 59b, which is rotatable on needle bearings and supported by thrust bearings, is terminated by a central ring bevel 62b. Finally, a cylindrical shell 63 bolted to the wrist casing 51 is terminated by an outer ring bevel 62c. Thrust bearings carried by the bearing race ring 54, the shell 63 and the outer wrist rod 69b support the wrist unit so that it is rotatable with respect to the forearm. Needle bearings are interposed between the concentric members of the compensating mechanism. The differential casing 52, being bolted to the wrist casing, rotates with the spindle 57.

The ring bevels 62a, 62b and 62c lie in the same plane. Above them, a spider 64 is mounted for free rotation on the spindle 57 being supported by a thrust bearing carried by the inner wrist rod 59a. The spider 64, which is shown in plan in FIGURE 8, has a hub with a central bore to receive the spindle 57 and three generally radial webs to support a thickened rim. Between the rim and the hub, three sub shafts 65 each carry three bevel gears 66 which are free to rotate on the stub shafts. When the spider is in position the sets of three bevel gears 66 mesh with the three ring bevels 62a, 62b and 62c.

The sets of three bevel gears 66 also mesh with three upper ring bevels 67a, 67b and 67c. The outer ring bevel 67c of these three is non-rotatable, being clamped between the differential casing 52 and the forearm casing 53 to which it is bolted. The central and inner ring bevels 67a and 67b are carried at the lower ends of upper concentric wrist rods 68a and 68b corresponding to lower wrist rods 59a and 59b. Thrust bearings and needle bearings are provided for the upper wrist rods as for the lower wrist rods.

The operation of the forearm compensating mechanism is now described with regard to the three rotary movements to be transmitted by the wrist rods and the central spindle. Relative rotation of the lower wrist rods 59a, 59b is caused by rotation of the handgrip about the wrist unit. This relative rotation is transmitted by the central and inner bevel gears 66 directly to the upper wrist rods 68a, 68b without rotation of the spider about the spindle 57. Although the relative rotation of the upper wrist rods is in a direction opposite to that of the lower wrist rods, this inversion is immaterial since it is cancelled by a similar inversion in the compensating mechanism of the slave forearm. Relative rotation of the wrist rods does not include a component of rotation relative to the central spindle so no compensation is necessary for this movement.

Relative rotation of the central spindle 57 is caused by two movements, interference between which is counteracted by the compensating mechanism. These two movements are flexure at the wrist unit causing relative rotation between the central spindle and the two wrist rods and rotation of the wrist unit with respect to the forearm causing relative rotation between the central spindle and the forearm or the differential casing 52 secured thereto. The distinction between these two movements is that in the former there is no relative rotation between the central spindle and the casing 52 whereas in the latter there is. Accordingly, the shell 63 is constituted as a control element indicative of the presence or absence of relative movement between the spindle and the casing 52. The shell is rigidly secured to the wrist casing 51 and indirectly, therefore, to the central spindle so that, when there is no relative rotation between the shell and the casing 52, the spider 64 is held stationary by the outer ring bevels 62c and 67c. With the spider stationary, relative rotation of the lower wrist rods and the central spindle is transmitted directly to the upper wrist rods by the bevels gears 66. On the other hand, when relative rotation of the shell and the casing 52 is caused by rotation of the wrist unit with respect to the forearm, the spider is caused to rotate at half the speed of relative rotation and in its turn causes the upper wrist rods 68a, 68b to rotate with respect to the lower wrist rods which are held stationary by the operator. The effect of the compensating movement applied by the spider is that the upper wrist rods remain stationary with respect to the central spindle.

It is to be understood that in operation of the manipulator the three movements just described are often transmitted stimultaneously through the compensating mechanism. The movements have been described separately for the purpose of simplicity. Furthermore it is to be understood that the slave forearm is provided with identical mechanism.

*Forearm and upper arm*

The forearm 17, to the lower end of which is bolted the forearm casing 53, is cylindrical and is telescopically mounted in a cylindrical upper arm 16 (Figures 9, 10, 11). Lugs 69 carried by the upper arm 16 and the forearm casing 53 provide anchorages for the rams 29 and 33 (which are not shown). To guide the telescopic movement of the forearm 17, it is provided with diametrically opposed ribs 71 running between rollers 72 carried by the upper arm; similarly the upper arm has diametrically opposed internal ribs 73 running between rollers 74 carried by the forearm. At its upper end the upper arm carries brackets 75 which are pivoted to the shoulder joint. It is to be understood that the master and slave forearms and upper arms are identical.

Within the forearm casing 53 decentralising gears (not shown), which are similar to the centralising gears within the wrist casing 51, convert rotary movements of the concentric spindle 57 and the upper wrist rods 68a, 68b relative to each other and to the differential casing 52 into rotary movements of three tubular connectors 76a, 76b, 76c (of which only two connectors 76a and 76c are visible in FIGURE 9). The upper ends of the three connectors 76a, 76b and 76c, are of square section and are keyed into three lower drive tubes 77a, 77b and 77c which form part of telescopic drive tubing extending through the forearm and upper arm. Upper drive tubes 78a, 78b and 78c are slidable within the lower drive tubes. Housed in a chamber 79 (FIGURES 10 and 12) are displacement gears which take the drive from one upper drive tube 78c to a displaced drive tube 78d which is aligned with the other drive tubes 78a and 78b.

*Shoulder joints*

The master shoulder joint (FIGURE 13) incorporates a pivot pin 81 journalled in brackets 75 carried at the top of the upper arm 16 and brackets 82 carried at one end of the beam 14 so that the master arm can be swung about the joint. The brackets 82 are bolted directly to the beam and are joined by a web which closes the end of the beam. The brackets 82 are bolted directly to the upper arm and are joined by a similar web 84. Cotter pins 85 key the pivot pin 81 to the brackets 75. The drive tubes 78a, 78b and 78c project through the web 84 in which they are journalled and are provided at the ends with pinions 86a, 86b and 86c respectively. Similarly drive tubes 87a, 87b and 87c extend through the beam 14, project through the web 83 in which they are journalled, and are provided at their ends with pinions 88a, 88b and 88c. Between the two webs, and embraced by the brackets 75 and 82, there is gearing which interconnects the drive tubes 78a, 78b, and 78c and the drive tubes 87a, 87b and 87c respectively and which constitutes a compensating mechanism to prevent interference with the transmission between the drive tubes by a swinging movement of the master arm about the shoulder joint.

The gearing in the shoulder joint incorporates three parallel trains of epicyclic gears interconnecting the three pairs of drive tubes. Thus, gearing interconnecting drive tubes 78a and 87a incorporates a sun gear 89a, planetary gears 91a and an annular gear 92a; gearing interconnecting drive tubes 78b and 87b incorporates a sun gear 89b, planetary gears 91b and an annular gear 92b; and gearing interconnecting drive tubes 78d and 87c incorporates a sun gear 89c, planetary gears 91c and an annular gear 92c. In each case drive is transmitted from the sun gear to the annular gear and compensation is applied, when necessary, by movement of the carriers on which the planetary gears are mounted.

The sun gears 89a, 89b, 89c are mounted for free rotation on the pivot pin 81; each is formed with a toothed flange 93a, 93b, 93c which meshes with its associated pinion 86a, 86b or 86c respectively. Furthermore, each sun gear has a shaft portion on which is mounted, for free rotation, the corresponding annular gear 92a, 92b or 92c. Pinned to each annular gear is a ring bevel 94a, 94b or 94c which meshes with its associated pinion 88a, 88b, or 88c. Thus the drive tube 78a is interconnected with the drive tube 87a by the following train of gears: pinion 86a, toothed flange 93a, sun gear 89a, planetary gears 91a, annular gear 92a, ring bevel 94a and pinion 88a. Similar trains of gears interconnect drive tubes 78b and 78d with drive tubes 87b and 87c.

A planetary gear carrier is formed by two wheels 95 and 96 joined at their peripheries by a web 97; the wheels 95 and 96 and the web 97 are formed as an integral casting. The web extends only partly around the periphery of the wheels so that it does not prevent the master arm from hinging about the joint through an angle of 110° from a horizontal position downwardly. The carrier is mounted, for free rotation, on the pivot pin 81. The carrier wheel 96 is formed with an axial rib on which is mounted an annular plate 98a. Carried by the carrier wheel 96 in gaps in the rib are stub shafts 99a which are supported by the annular plate 98a and on which are mounted, for free rotation, the planetary gears 91a. The carrier wheel 95 carries in a similar manner a set of stub shafts on one side for the planetary gears 91b and a second set of stub shafts on the other side for the planetary gears 91c.

Compensating movement is applied to the carrier by means of epicyclic gearing incorporating a sun gear 101 mounted on the pivot pin 81 to which it is splined so that it rotates with the pin, planetary gears 102 mounted on the stub shafts 99a carried by the carrier wheel 96, and an annular gear 103 rigidly secured to the cap 84 by a bracket 104 bolted thereto. When the master arm is swung about the shoulder joint relative rotation occurs between the sun gear 101 and the annular gear 103 which causes a compensating movement to be applied through the planetary gears 102 to the carrier. By means of planetary gears 91a, 91b, 91c the compensating movement of the carrier introduces a compensation into the gear trains interconnecting the drive tubes 78a, 78b and 78d and the drive tubes 87a, 87b and 87c. The four parallel trains of epicyclic gears being mechanically identical, the effect of the compensating movement is that, if relative movement between the sun gears 89a, and 89b, 89c and the pivot pin, while the master arm is swung, is prevented by the operator holding the handgrip steady, no rotary movement is applied to the annular gears 92a, 92b and 92c and consequently the drive tubes 78a, 87b and 87c in the beam.

The slave shoulder joint is similar to the master shoulder joint in all respects save that the pinions driving the sun gears are mounted on drive tubes in the beam and the pinions driven by the annular gears are mounted on drive tubes in the slave arms. This inversion is a consequence of the need to transmit drive through the shoulder joint from the sun to the annular wheels.

For simplicity no direct reference has been made to the bearings provided in the shoulder joints; their disposition can be seen in FIGURE 13.

*Beam, socket and pressure-tight seal*

The beam 14 (FIGURE 14) comprises an outer beam casing 141 and an inner casing 142 telescopically slidable in the outer casing. A socket 13 in the wall 11 is provided with a liner 104 in which the outer beam casing is rotatable. At the outer end of the socket, that is to say the end outside the shielded cabinet, a plate 105 (FIGURES 14 and 15) carries brackets 106 in which are mounted rollers 107 by which the outer casing is supported. To restrain axial movement of the outer casing, a bracket 108 provides a mounting for two rollers 109 which grip a guide 11 projecting radially of the outer casing 141. The outer casing is similarly mounted at its inner end on rollers 112 carried by brackets 113 (FIGURES 14 and 17).

Within the outer casing 141, the inner casing is slidable and rotatable on balls 114 at its outer end (FIGURES 14 and 16) and balls 115 at its inner end (FIGURES 14 and 20). The balls 114 are seated in the casing 142 and the balls 115 are seated in brackets 116 carried by a cylindrical pressure-tight casing 117. A hydraulic ram 123 is secured to a partition (not shown) which traverses the outer beam casing 141 and has a ram rod 124 secured to a partition 125 transverse the inner beam casing 142. Thus the ram is connected between the two casings and the inner casing is movable telescopically within the outer casing by means of the ram. In this manner the master and slave shoulder joints at each end of the beam are movable axially of the beam to cause transverse displacement of the handler relative to the handgrip.

Relative rotation between the inner and outer casings is controlled by a pinion 150 (FIGURE 14) carried by the outer casing which meshes with a toothed quadrant 151 formed in the parition 125 carried at the inner end of the inner casing. The pinion is mounted on a telescopic spindle 152 which extends axially of the outer casing to a hydraulic motor within the beam by which the spindle is rotatable. For normal operation of the manipulator the inner and outer casings are locked against relative rotation by means of the pinion and the toothed quardrant. There are occasions, however, when it is desirable to displace the slave arm relative to the master arm in a plane parallel to the cabinet wall; such lateral displacement of the slave arm is effected by rotation of the pinion to cause slight relative rotation of the inner and outer casings to a maximum, for example, of 15 degrees each way.

Extending through the outer and inner beam casings 141 and 142 between the master shoulder joint and the slave shoulder joint are drive tubes 87a, 87b and 87c (of which only 87c is visible in FIGURE 20). These drive tubes are splined so as to be telescopic in a manner similar to the drive tubes in the master and slave arms. Furthermore, these drive tubes are provided with universal joints so that they skew to accept slight relative rotation of the beam casings. As stated above, rotary drive transmitted through the drive tubes 87a, 87b and 87c may be servo-assisted by hydraulic motors 24 (FIGURE 1).

For the purpose of sealing the manipulator into the cabinet the pressure-tight casing 117 is bolted to a bearing plate 118 at the inner end of the socket and is closed by an end plate 119 having an aperture in which the inner beam is slidable. A packing ring 121 carried by the end plate 119 makes pressure-tight contact with the outer surface of the inner beam casing. A similar pressure-tight casing 120 is provided at the outer end of the beam; this casing is shown broken away in FIGURE 14. When the manipulator is used with alpha-active materials in the shielded cabinet, the space within the cabinet is maintained at a reduced gas pressure whilst the space within the pressure-tight casings 117 and 120 and within the beam is pressurised with an inert gas, such as nitrogen or argon, leakage through the inner casing 142 being prevented by a partition 130. In the event of any leakage through the seal at the inner end of the socket, the inert gas under pressure escapes into the cabinet thus preventing escape of alpha-particles from the cabinet. The pressure of the inert gas in the casing 117 is registered on a gauge 122 (FIGURE 1). Any leakage is indicated by a drop in the pressure registered.

I claim:

1. A remote-control manipulator comprising two tubular beam casings which are axially slidable and rotatable relative to each other, the two casings defining a transverse extensible beam, shoulder joints at opposed ends of the beam, a master arm and a slave arm pivotally connected to the beam at the respective shoulder joints, a hand grip carried by the master arm, a work handler carried by the slave arm, link means between the hand grip and the work handler including telescopic rotary connecting rods extending axially of the beam between the shoulder joints, means to cause relative rotation of the two beam casings to permit lateral displacement of the slave arm relative to the master arm, and means to cause relative axial displacement of the two beam casings thereby to cause transverse displacement of the handler relative to the hand grip.

2. A remote-control manipulator comprising two tubular beam casings which are axially slidable and rotatable relative to each other, the two casings defining a transverse extensible beam, shoulder joints at opposed ends of the beam, a master arm and a slave arm pivotally connected to the beam at the respective shoulder joints, a hand grip carried by the master arm, a work handler carried by the slave arm, link means between the hand grip and the work handler including telescopic rotary connecting rods extending axially of the beam between the shoulder joints, universal joints in the connecting rods to enable the rods to skew during relative rotation of the two beam casings, means to cause relative rotation of the two beam casings to permit lateral displacement of the slave arm relative to the master arm, and means to cause relative axial displacement of the two beam casings thereby to cause transverse displacement of the handler relative to the hand grip.

References Cited by the Examiner
UNITED STATES PATENTS 2,695,715   11/1954   Goertze et al.
2,888,154   5/1959    Jelatis et al.

HUGO O. SCHULZ, *Primary Examiner.*